United States Patent
Lee et al.

(10) Patent No.: US 11,190,482 B2
(45) Date of Patent: Nov. 30, 2021

(54) ELECTRONIC DEVICE FOR SUPPORTING LOW-LATENCY DOMAIN NAME SYSTEM (DNS) PROCESSING

(71) Applicant: Samsung Electronics Co., Ltd., Suwon-si (KR)

(72) Inventors: Jookwan Lee, Suwon-si (KR); Hong Kim, Suwon-si (KR); Hansung Leem, Suwon-si (KR); Junsuk Kim, Suwon-si (KR); Hyejeong Kim, Suwon-si (KR); Minjung Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/842,170

(22) Filed: Apr. 7, 2020

(65) Prior Publication Data
US 2020/0329007 A1 Oct. 15, 2020

(30) Foreign Application Priority Data
Apr. 10, 2019 (KR) .................. 10-2019-0041987

(51) Int. Cl.
*H04L 12/00* (2006.01)
*H04L 29/12* (2006.01)

(52) U.S. Cl.
CPC ...... *H04L 61/1511* (2013.01); *H04L 61/2053* (2013.01); *H04L 61/2076* (2013.01); *H04L 61/2553* (2013.01)

(58) Field of Classification Search
CPC . H04L 61/2553; H04L 69/28; H04L 61/2076; H04L 61/1511; H04L 61/2053
(Continued)

(56) References Cited

U.S. PATENT DOCUMENTS

| 8,346,968 B2* | 1/2013 | Ait-Ameur | ......... H04L 61/1511 709/245 |
| 8,583,806 B2* | 11/2013 | Fleischman | ......... H04L 61/1511 709/227 |

(Continued)

FOREIGN PATENT DOCUMENTS

| CN | 103929507 A | 7/2014 |
| EP | 2991271 A1 | 3/2016 |
| KR | 10-2015-0046675 A | 4/2015 |

OTHER PUBLICATIONS

International Search Report of the International Searching Authority in connection with International Application No. PCT/KR2020/002184 dated May 25, 2020, 3 pages.
(Continued)

*Primary Examiner* — Frantz Coby

(57) ABSTRACT

An electronic device includes a communication processor; a processor connected to the communication processor; and a memory connected to the processor and the communication processor. The memory stores a domain name system (DNS) table, first instructions that, when executed, cause the processor to: generate a first DNS query message including a domain address based on execution of a networking service; and deliver the first DNS query message to the communication processor, and second instructions that, when executed, cause the communication processor to update the DNS table by periodically receiving a first DNS response message including an IP address corresponding to the domain address, as a response to the first DNS query message, delivering the first DNS response message to the processor; transmitting a second DNS query message including the domain address to the network, and receiving a second DNS response message, as a response to the second DNS query message.

19 Claims, 8 Drawing Sheets

(58) Field of Classification Search
USPC .......................................................... 709/245
See application file for complete search history.

(56) References Cited

U.S. PATENT DOCUMENTS

| | | | |
|---|---|---|---|
| 8,738,765 B2 | 5/2014 | Wyatt et al. | |
| 9,215,205 B1* | 12/2015 | Smith | H04L 61/1511 |
| 9,231,903 B2* | 1/2016 | Seastrom | H04L 61/1552 |
| 9,444,916 B2* | 9/2016 | Backholm | H04L 61/1511 |
| 9,843,601 B2* | 12/2017 | Fakeri-Tabrizi | H04L 63/1441 |
| 10,530,738 B2* | 1/2020 | Kagan | H04L 61/1511 |
| 2003/0039268 A1* | 2/2003 | Chong | H04L 29/06 370/466 |
| 2010/0011420 A1* | 1/2010 | Drako | H04L 51/12 726/5 |
| 2010/0106833 A1 | 4/2010 | Banerjee et al. | |
| 2010/0332680 A1* | 12/2010 | Anderson | H04L 61/6009 709/245 |
| 2012/0297478 A1* | 11/2012 | Martin | H04L 63/1483 726/22 |
| 2012/0317153 A1* | 12/2012 | Parthasarathy | H04L 61/6009 707/805 |
| 2012/0324094 A1* | 12/2012 | Wyatt | H04L 43/0876 709/224 |
| 2013/0198269 A1* | 8/2013 | Fleischman | H04L 61/20 709/203 |
| 2014/0214958 A1* | 7/2014 | Cheshire | H04L 61/1511 709/204 |
| 2015/0058488 A1 | 2/2015 | Backholm | |
| 2015/0215267 A1 | 7/2015 | Kagan | |
| 2015/0312154 A1* | 10/2015 | Beevers | H04L 61/1511 709/223 |
| 2016/0239899 A1* | 8/2016 | Kamdar | G06Q 30/0629 |
| 2017/0317968 A1 | 11/2017 | Droms et al. | |
| 2018/0191672 A1* | 7/2018 | Torres | H04L 61/1511 |
| 2018/0206191 A1 | 7/2018 | Fiennes | |

OTHER PUBLICATIONS

European Search Report in connection with European Application No. 20160661.3 dated May 29, 2020, 7 pages.

Cohen, Edith, et al, "Proactive Caching of DNS Records: Addressing a Performance Bottleneck," Proceedings of Saint 2001 Symposium on Applications and the Internet, Jan. 8-12, 2001, San Diego, CA, USA, IEEE Computer Society, 10 pages.

Communication pursuant to Article 94(3) EPC dated Apr. 22, 2021, in connection with European Patent Application No. 20160661.3, 6 pages.

* cited by examiner

ELECTRONIC DEVICE FOR SUPPORTING LOW-LATENCY DOMAIN NAME SYSTEM (DNS) PROCESSING

CROSS-REFERENCE TO RELATED APPLICATION

This application is based on and claims priority under 35 U.S.C. 119 to Korean Patent Application No. 10-2019-0041987 filed on Apr. 10, 2019 in the Korean Intellectual Property Office, the disclosure of which is herein incorporated by reference in its entirety.

BACKGROUND

1. Field

The disclosure relates to an electronic device for supporting provision of an Internet protocol (IP) address corresponding to a domain address of an external electronic device with which communication is to be performed during execution of a service or a function.

2. Description of Related Art

An electronic device may transmit a domain name system (DNS) query message, which includes a domain address of an external electronic device, to a DNS server through a network, may recognize the location, for example, an IP address, of the external electronic device, from a DNS response message received from the DNS server, and may communicate with the external electronic device through the network based on the recognition.

The above information is presented as background information only to assist with an understanding of the disclosure. No determination has been made, and no assertion is made, as to whether any of the above might be applicable as prior art with regard to the disclosure.

SUMMARY

The time required for a DNS message to make a round trip (e.g., round-trip time (RTT)) in a network may be, for example, tens to hundreds milliseconds (ms). In this network environment, a service or a function which needs support for low latency may not be smoothly provided to a user.

An aspect of the disclosure is to provide an electronic device configured to be capable of quickly recognizing a valid IP address of an external electronic device which is required during execution of a service or a function, regardless of the latency of data due to a network environment.

In accordance with an aspect of the disclosure, an electronic device may include: a communication processor; a processor configured to be operatively connected to the communication processor; and a memory configured to be operatively connected to the processor and the communication processor. The memory may store a domain name system (DNS) table, and may store first instructions that, when executed, cause the processor to: generate a first DNS query message including a domain address based on execution of a networking service; and deliver the first DNS query message to the communication processor. The memory may store second instructions that, when executed, cause the communication processor to update the DNS table by periodically performing: an operation of receiving, from a network, a first DNS response message including an IP address corresponding to the domain address, as a response to the first DNS query message, and delivering the first DNS response message to the processor; and an operation of transmitting a second DNS query message including the domain address to the network, and receiving, from the network, a second DNS response message as a response to the second DNS query message.

In accordance with another aspect of the disclosure, a method for operating an electronic device may include: generating, by a processor of the electronic device, a first DNS query message including a domain address based on execution of a networking service so as to deliver the first DNS query message to a communication processor of the electronic device which is different from the processor; and updating, by the communication processor, a DNS table by periodically performing an operation of receiving, from a network, a first DNS response message including an IP address corresponding to the domain address, as a response to the first DNS query message, and delivering the first DNS response message to the processor, and an operation of transmitting a second DNS query message including the domain address to the network, and receiving, from the network, a second DNS response message as a response to the second DNS query message.

According to various embodiments, an electronic device can quickly recognize a valid IP address of an external electronic device which is required during execution of a service or a function, and can execute the service or the function by using the recognized IP address.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
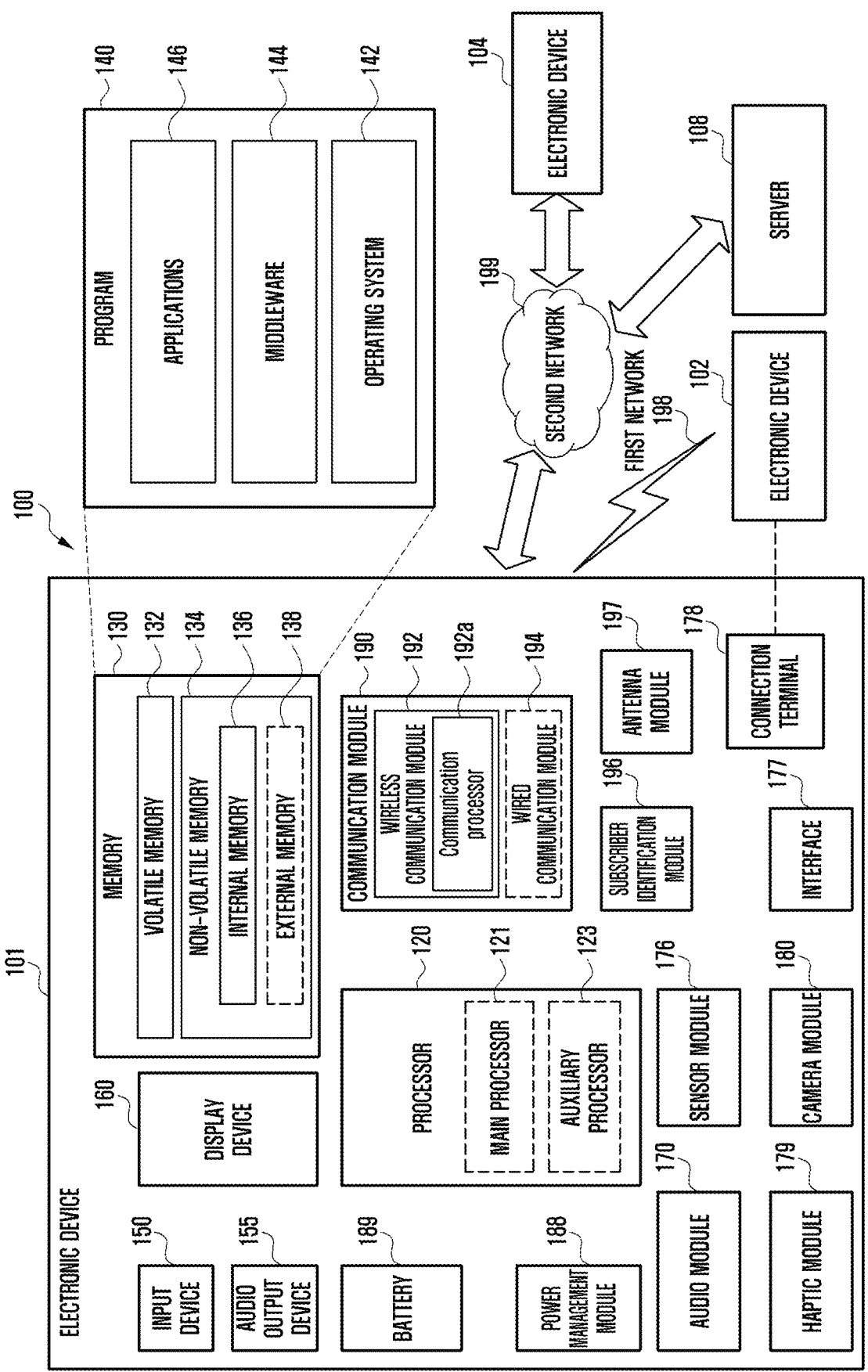
FIG. 1 is a block diagram illustrating a configuration of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), or a sensor hub processor) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may include a communication processor (CP) 192a for supporting a wireless communication. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
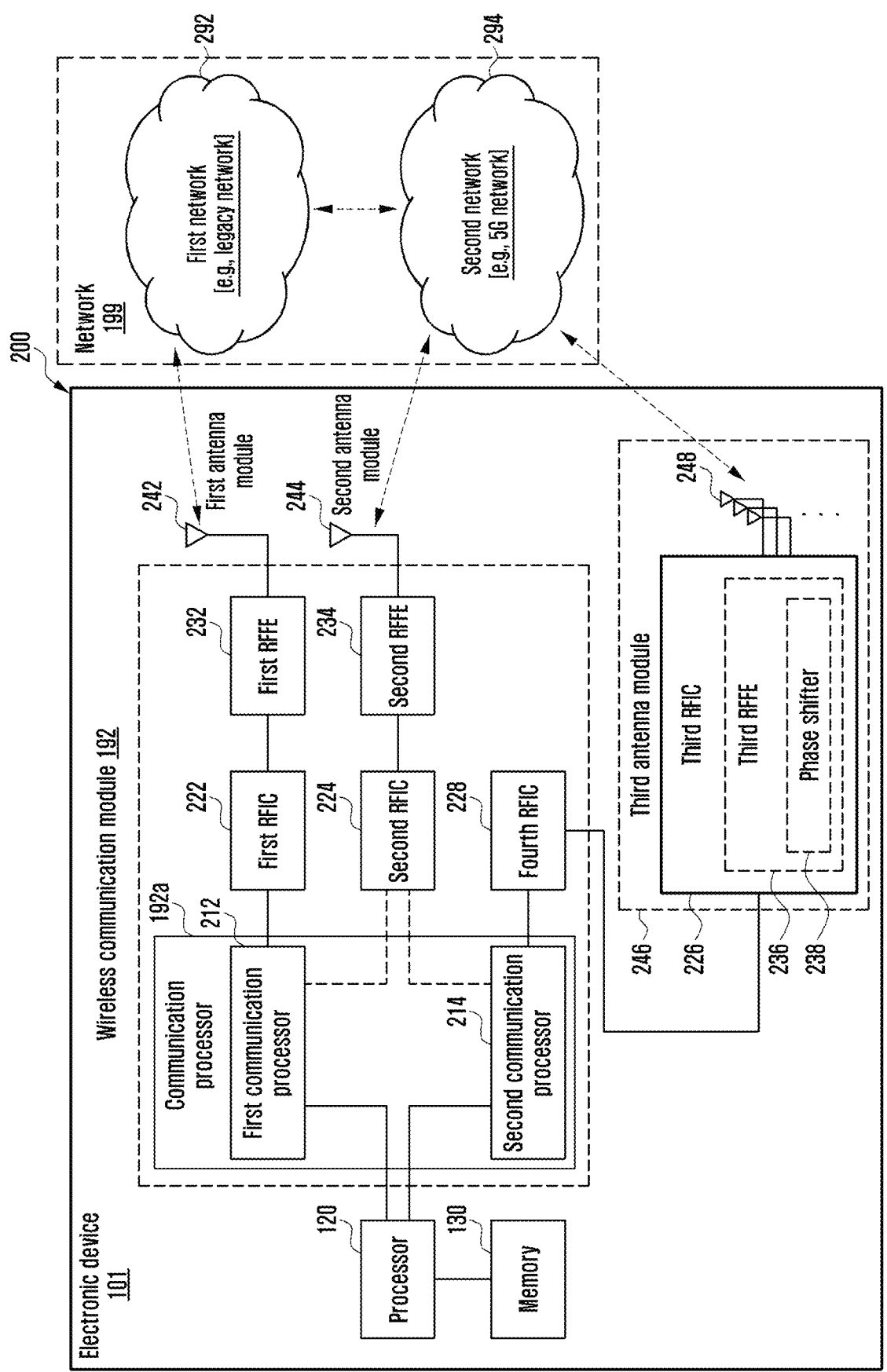
FIG. 2 is a block diagram illustrating a configuration of an electronic device for supporting legacy network communication and 5G network communication according to various embodiments.

FIG. 2 is a block diagram 200 of an electronic device 101 for supporting legacy network communication and 5G network communication according to various embodiments.

Referring to FIG. 2, the electronic device 101 may include a communication processor 192a, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The communication processor 192a may include a first communication processor 212 and a second communication processor 214.

The network 199 may include a first network 292 and a second network 294. According to another embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or included as a part of the third RFIC 226.

The first communication processor 212 may support establishment of a communication channel in a band to be used for wireless communication with the first network 292, and legacy network communication through the established communication channel. According to various embodiments, the first network may be a legacy network including a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and 5G network communication through the established communication channel. According to various embodiments, the second network 294 may be a 5G network defined by third generation partnership project (3GPP). Additionally, according to an embodiment, the first communication processor 212 or the second communication processor 214 may support establishment of a communication channel corresponding to another designated band (for example, about 6 GHz or lower) among the bands to be used for wireless communication with the second network 294, and 5G network communication through the established communication channel. According to an embodiment, the first communication processor 212 and the second communication processor 214 may be implemented inside a single chip or a single package. According to various embodiments, the first communication processor 212 or the second communication processor 214 may be formed inside a single chip or a single package together with a communication module 190.

The first RFIC 222 may convert a baseband signal generated by the first communication processor 212 into a radio frequency (RF) signal at about 700 MHz to about 3 GHz, which is used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that is used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this case, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this case, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may be formed as an antenna array including multiple antenna elements that may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include only an access network (for example, 5G radio access network (RAN) or next-generation network (NG RAN)) and include no core network (for example, next-generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
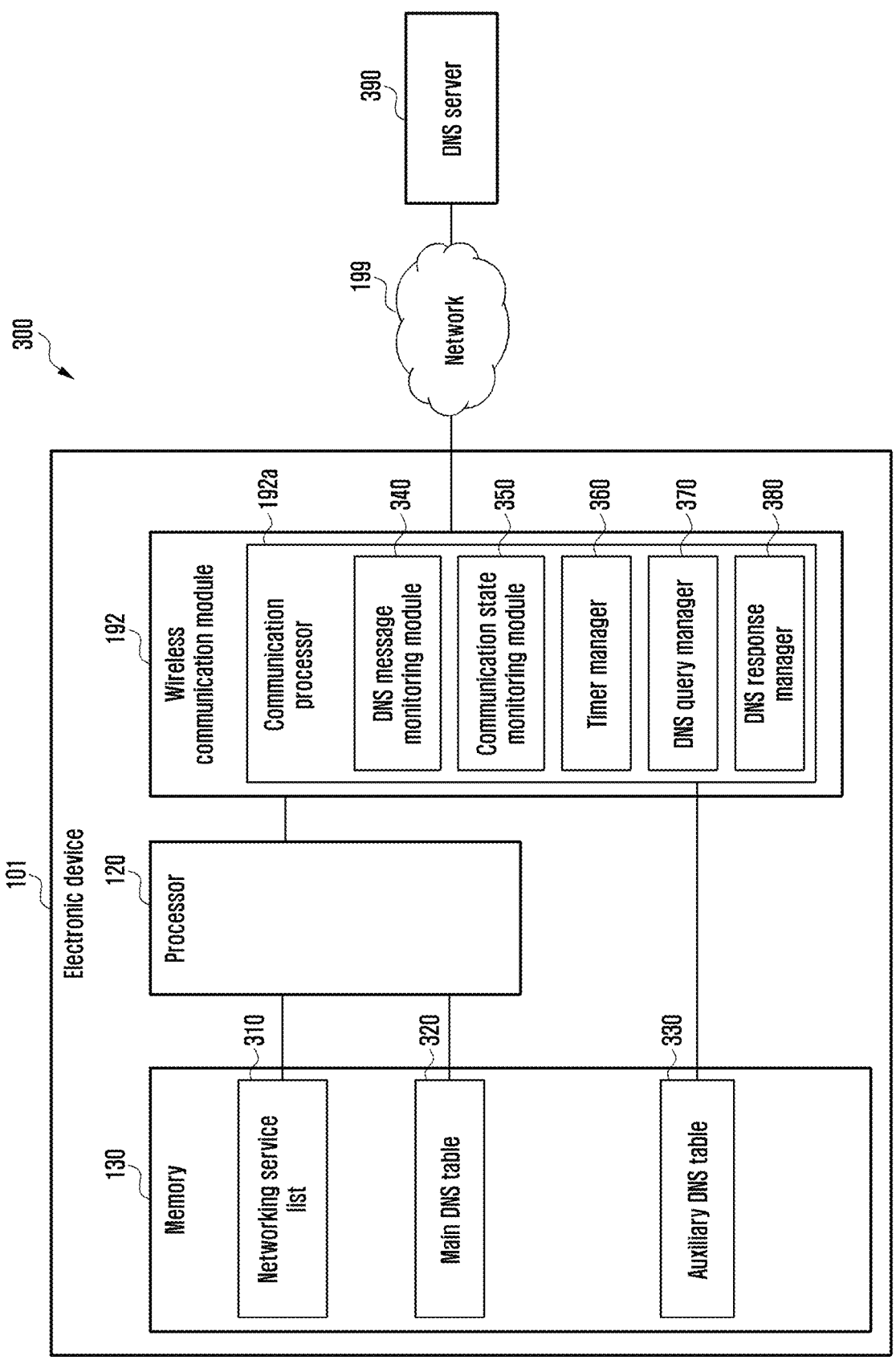
FIG. 3 is a block diagram illustrating a configuration of an electronic device for supporting holding of a valid IP address according to various embodiments.

FIG. 3 is a block diagram 300 illustrating a configuration of an electronic device 101 for supporting holding of a valid IP address according to various embodiments. Referring to FIG. 3, the electronic device 101 may include a processor 120, a memory 130, and a wireless communication module 192, and may communicate with a DNS server 390 through a network 199. Descriptions overlapping those of FIG. 1 and FIG. 2 will be omitted or briefly made.

The wireless communication module 192 according to various embodiments may support establishment of a wireless communication channel (or a session) for communication between the processor 120 and the network 199. For example, the wireless communication module 192 may be connected to a core network of the network 199 by establishing a wireless communication channel with an access network (e.g., a base station) of the network 199, and may communicate with the DNS server 390 through the core network. The wireless communication module 192 may transmit a DNS query message including a domain address to the DNS server 390 through the network 199. The DNS server 390 may include multiple servers. The multiple servers may find the location, for example, an IP address, of a device corresponding to the domain address by exchanging DNS messages through the network 199, and one (e.g., a local DNS server) of the multiple servers may transmit a DNS response message including the IP address and a valid time value of the IP address, to the wireless communication module 192 through the network 199.

According to various embodiments, the processor 120 (e.g., the main processor 121) may determine activation of a DNS alive function based on a user input. The processor 120 may display a configuration menu including an item which allows a user to select whether to activate a DNS alive function, based on a user input received from an input apparatus (e.g., a touch-screen display of the input apparatus 150 or the display apparatus 160), and may determine activation of the DNS alive function based on the user's selection of the item in the configuration menu.

According to various embodiments, the processor 120 (e.g., the main processor 121) may support a DNS alive function. For example, a DNS alive function may include an operation of maintaining, as a valid value, an IP address of an external electronic device, with which communication is to be performed, by periodically (e.g., before expiration of a valid time) performing an operation of: transmitting, to the DNS server 390, a DNS query message including a domain address of the external electronic device which communicates with the wireless communication module 192 during execution of a service or a function; and receiving, from the DNS server 390, a DNS response message including an IP address corresponding to the domain address and a valid time value (e.g., time to live (TTL)) of the IP address. As an example, the communication processor 192a may perform a DNS alive function by transmitting or receiving data to/from the DNS server 390 through the wireless communication module 192 while the processor 120 (e.g., an application processor) is in an inactive (e.g., sleep) state. As a result of execution of the DNS alive function, the processor 120 may immediately recognize, through the communication processor 192a, a valid IP address required during execution of a service or a function.

According to various embodiments, the memory 130 may store a networking service list 310, a main DNS table 320, or an auxiliary DNS table 330.

According to various embodiments, the processor 120 (e.g., the main processor 121) may manage the networking service list 310. For example, if an application for providing a service or a function (hereinafter, collectively referred to as a "networking service") which needs support for a wireless communication standard (e.g., an ultra-reliable and low-latency communication (URLLC) of a 5G network which defines, for example, 1 ms or less, as a requirement for a latency time in 3GPP or IMT-2020) is installed in the electronic device 101, the processor 120 may add, to the list 310, related information (e.g., a name (e.g., a domain name (DN)) of a networking service, or an IP address and a port number assigned by the program 140 (e.g., the operating system 142)). The networking service list 310 may include an application (e.g., the application 146 of FIG. 1). For example, an application supporting a particular networking service (e.g., a streaming service) may be included in the list 310. If the application is deleted from the electronic device 101, the processor 120 may delete the corresponding networking service-related information from the list 310. The processor 120 may recognize that the related information (e.g., a name or an IP/port) is changed due to the update of the networking service, and may update the corresponding information to the changed information in the list 310 based on the recognition.

According to various embodiments, the processor 120 (e.g., the main processor 121) may manage the main DNS table 320. The main DNS table 320 may include items (or entities) related to a networking service (e.g., a URLLC networking service) configured to hold a valid IP address. For example, the main DNS table 320 may include, for each networking service to be managed, at least one of 1) a name of a networking service, 2) an IP address and a port number of the networking service, 3) a DNS query message (e.g., a domain address of an external electronic device (e.g., a website) with which communication is to be performed during execution of the networking service), 4) a DNS response message (e.g., an IP address of an external electronic device), 5) information indicating an owner (e.g., the processor 120 or the communication processor 192a) that triggers a DNS query for acquisition of an IP address of an external electronic device, 6) a first time value (time to live (TTL)) representing a valid time of an IP address of an external electronic device, or 7) a second time value (TTL-a) set to be less than the first time value for the purpose of transmission of a DNS query message before expiration of the valid time.

In an embodiment, the processor 120 may receive, from the communication processor 192a, at least one (e.g., an IP address and/or a first time value of an external electronic device) of items (or entities) constituting the main DNS table 320, and may update a corresponding entity to the received entity in the DNS information.

In an embodiment, before expiration of a valid time, the processor 120 may deliver a DNS query message to the communication processor 192a so as to transmit the DNS query message to the DNS server 390 through the wireless communication module 192. The processor 120 may receive a DNS response message from the communication processor 192a, and may update, in the main DNS table 320, an IP address and a TTL value of the corresponding DNS information to an IP address and a TTL value included in the DNS response message.

In an embodiment, the processor 120 may add DNS information to the DNS table 320 or may delete DNS information therefrom, based on a user input received from an input apparatus (e.g., a touch-screen display of the input apparatus 150 or the display apparatus 160). The processor 120 may change at least one (e.g., the second time value (TTL-a)) of the above-described entities 1 to 7 based on a user input.

In an embodiment, the processor 120 may generate the main DNS table 320 based on subscriber information (e.g., information indicating whether 5G network communication is available) stored in a subscriber identification module (e.g., the subscriber identification module 196 of FIG. 1). While the communication processor 192a performs signaling (e.g., transmission/reception of a radio resource control (RRC) message) for receiving a radio resource (e.g., the size of a packet transmissible once through an established wireless communication channel) allocated by the network 199, the communication processor 192a may receive information (e.g., bearer information for 5G network communication, or logical channel prioritization (LCP) of a MAC layer therefor) from the network 199. The communication processor 192a may deliver the received information to the processor 120 based on switching of the processor 120 from an inactive state to an active state. The processor 120 may update the main DNS table 320 based on the received information.

In various embodiments, the communication processor 192a may manage the auxiliary DNS table 330.

In an embodiment, the processor 120 may recognize that the communication processor 192a switches from an inactive state to an active state (e.g., execution of communication with the network 199). The processor 120 may transmit the main DNS table 320 to the communication processor 192a based on the recognition. The communication processor 192a may synchronize the auxiliary DNS table 330 with the main DNS table 320. For example, the processor 120 may transmit filter information on a URLLC networking service (e.g., a service name, a flag value representing the necessity of execution of a DNS alive function, an IP address of a corresponding service, a domain address thereof, an IP address corresponding to the domain address thereof, a TTL thereof, or a TTL-a thereof) to the communication processor 192a. The communication processor 192a may synchronize the auxiliary DNS table 330 with the main DNS table 320 by using the received filter information. The communication processor 192a may recognize that the received flag value represents the necessity of execution of a DNS alive function, and may perform the DNS alive function based on the recognition. For example, the communication processor 192a may perform a DNS alive function during an active state, and may update the auxiliary DNS table 330 based on a result of the execution. The network 199 (e.g., the first network 292 and/or the second network 294 of FIG. 2) may support: an operation of performing discontinuous reception (DRX) of data while a communication state of the electronic device 101 is an idle state in which the electronic device 101 does not communicate with the network 199; and an operation of performing connected mode DRX (CDRX) of data while a communication state of the electronic device 101 is a connected state in which the electronic device 101 communicates (e.g., transmits or receives an RRC message) with the network 199. If the communication processor 192a receives a wireless signal (e.g., a paging signal) while a communication state of the electronic device 101 is an idle state (e.g., before expiration of a DRX configuration timer), the communication processor 192a may perform a DNS alive function, and may update the auxiliary DNS table 330 based on an execution result. When the electronic device 101 is in a connected state, transmission of a DNS query message may cause unnecessary consumption of current. While the electronic device 101 is in a connected state, the communication processor 192a may determine whether to activate a DNS alive function, based on at least one of a power amount of a battery (e.g., the battery 189 of FIG. 1), a current consumption amount per hour of the electronic device 101, and an elapsed time of CDRX.

In an embodiment, the communication processor 192a may determine that a DNS alive function is to be performed, based on information received from the network 199. For example, the received information is system information broadcast by a base station of the network 199, and may include "information (e.g., upperlayerindication or RestrictDCNR) indicating that the network 199 supports 5G network communication" and/or "information on a URLLC networking service".

In an embodiment, the communication processor 192a may recognize that the processor 120 switches from an inactive state to an active state (e.g., execution of a networking service), and may transmit the auxiliary DNS table 330 to the processor 120 based on the recognition. The processor 120 may synchronize the main DNS table 320 with the auxiliary DNS table 330.

In an embodiment, when the communication processor 192a is in an inactive state, the communication processor 192a may temporarily switch to an active state, for example, for RRC signaling, and during the active state, may update the auxiliary DNS table 330 based on an execution result of a DNS alive function. The communication processor 192a may transmit the auxiliary DNS table 330 to the processor 120 based on switching of the processor 120 from an inactive state to an active state (e.g., execution of a networking service). The processor 120 may synchronize the main DNS table 320 with the auxiliary DNS table 330.

According to various embodiments, the processor 120 (e.g., the main processor 121) may acquire, from the main DNS table 320, an IP address required during execution of a networking service. In this example, the main DNS table 320 may be in an alive state in which the main DNS table 320 is managed (e.g., updated) by the processor 120. In case that the state of the processor 120 changes from an active state to an inactive state, the main DNS table 320 may be changed to a non-alive state in which the main DNS table 320 is not used.

In an embodiment, the processor 120 may determine whether an IP address of DNS information is valid, based on a TTL value. Based on determination of the IP address of the DNS information as being valid, the processor 120 may acquire the corresponding IP address from the main DNS table 320. Based on determination of the IP address of the DNS information as being invalid, the processor 120 may deliver a DNS query message for acquisition of a valid IP address to the communication processor 192a so as to transmit the DNS query message to the DNS server 390. The processor 120 may receive, from the communication processor 192a, a DNS response message received by the communication processor 192a from the DNS server 390, and may update, in the main DNS table 320, an IP address and a TTL value of the corresponding DNS information to an IP address and a TTL value included in the DNS response message.

According to various embodiments, the communication processor 192a may acquire, from the auxiliary DNS table 330, an IP address required during execution of a networking service, and may transmit the same to the processor 120. The auxiliary DNS table 330 may be in an alive state in which the auxiliary DNS table 330 is managed (or updated) by the communication processor 192a. As the state of the communication processor 192a changes from an active state to an inactive state, the auxiliary DNS table 330 may be changed to a non-alive state in which the auxiliary DNS table 330 is not used.

In an embodiment, the communication processor 192a may determine whether an IP address of DNS information is valid, based on a TTL value. Based on determination of the IP address of the DNS information as being valid, the communication processor 192a may acquire the corresponding IP address from the auxiliary DNS table 330, and may transmit the same to the processor 120. Based on determination of the IP address of the DNS information as being invalid, the communication processor 192a may transmit, to the DNS server 390, a DNS query message for acquisition of a valid IP address. The communication processor 192a may transmit, to the processor 120, a DNS response message received from the DNS server 390, and may update, in the auxiliary DNS table 330, an IP address and a TTL value of the corresponding DNS information to an IP address and a TTL value included in the DNS response message.

According to various embodiments, the communication processor 192a may include a DNS message monitoring module 340, a communication state monitoring module 350, a timer manager 360, a DNS query manager 370, or a DNS response manager 380. At least one of the modules 340, 350, 360, 370, and 380 may be implemented in software (e.g., the program 140 of FIG. 1), and when the communication processor 192a is executed, the communication processor 192a may perform instructions of the software.

According to various embodiments, if an uplink packet is delivered from the processor 120 to the communication processor 192a, the DNS message monitoring module 340 may confirm (or identify), from the uplink packet, an IP address of a destination to which the uplink packet is to be transmitted, and may determine the uplink packet as a DNS query message based on recognition of the confirmed IP address as an IP address of the DNS server 390. If a downlink packet is received from the DNS server 390 through the network 199, the DNS message monitoring module 340 may confirm, from the downlink packet, an IP address of a source having transmitted the downlink packet, and may determine the downlink packet as a DNS response message based on recognition of the confirmed IP address as the IP address of the DNS server 390.

According to various embodiments, the communication state monitoring module 350 may monitor a communication state of the electronic device 101. Examples of the communication state of the electronic device 101 may include an idle state, a connected state, and an inactive state in which the electronic device 101 stays for a predetermined time before transitioning to an idle state if data is not transmitted or received for a predetermined time in a connected state.

According to various embodiments, the timer manager 360 may determine a time point at which a DNS query message is to be transmitted, based on a second time value of the auxiliary DNS table 330. For example, the timer manager 360 may determine transmission of a DNS query message when a timer corresponding to a second time expires.

According to various embodiments, the timer manager 360 may determine a time point at which a DNS query message is to be transmitted, based on a communication state of the electronic device 101. For example, in cast that a communication state of the electronic device 101 switches from an idle state to a connected state, the timer manager 360 may determine transmission of a DNS query message.

If the switching between communication states frequently occurs, a DNS query message may also be unnecessarily frequently transmitted accordingly. In order to prevent such overhead, the timer manager 360 may manage a timer. For example, if the switching occurs, the timer manager 360 may confirm (or identify) a remaining time of a timer corresponding to a second time. If the remaining time is greater than a designated threshold, the timer manager 360 may defer transmission of a DNS query message, and may determine transmission of a DNS query message only if the remaining time is less than the designated threshold.

According to various embodiments, the DNS query manager 370 may copy and store a DNS query message received from the processor 120. The DNS query manager 370 may transmit the copied DNS query message to the DNS server 390 through the network 199 at the transmission time point determined by the timer manager 360.

According to various embodiments, the DNS response manager 380 may copy and store a DNS response message received from the DNS server 390 through the network 199. If a DNS query message is received from the processor 120 within a valid time, the DNS response manager 380 may transmit the copied DNS response message to the processor 120.

Figure 4:
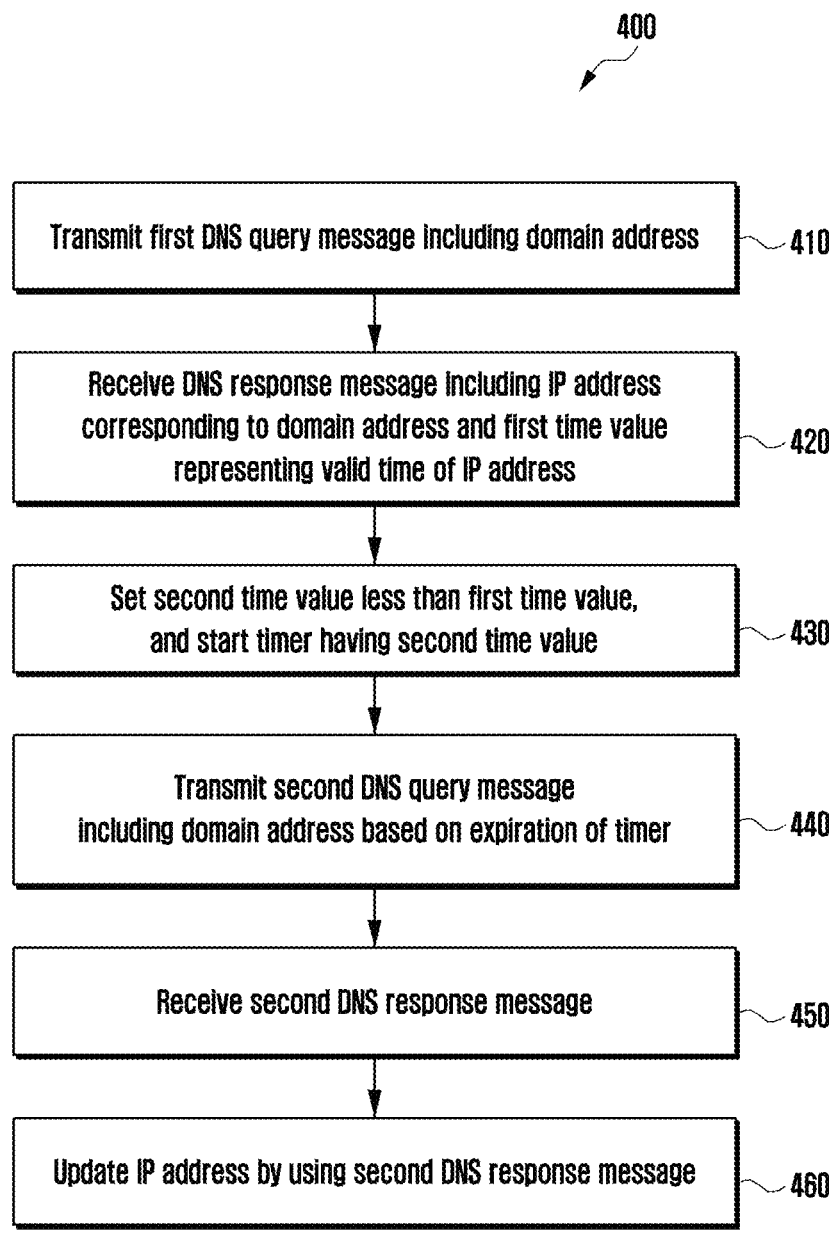
FIG. 4 is a flowchart illustrating operations of holding a valid IP address according to various embodiments.

FIG. 4 is a flowchart illustrating operations 400 of the communication processor 192a for holding a valid IP address according to various embodiments.

In various embodiments, in operation 410, the communication processor 192a may transmit a first DNS query message, which includes a domain address and has been received from the processor 120, to the DNS server 390 through the network 199. For example, a domain address may be input to the electronic device 101 through an input apparatus (e.g., a touch screen). A domain address may be a domain address of an external electronic device which is previously configured to be automatically connected during execution of a networking service. The processor 120 may generate a first DNS query message, and may transmit the same to the communication processor 192a. Upon receiving the first DNS query message, the communication processor 192a may transmit the first DNS query message to the DNS server 390 through the network 199.

In various embodiments, in operation 420, the communication processor 192a may receive a DNS response message, which includes an IP address corresponding to the domain address and a first time value (a first TTL) representing a valid time of the IP address, from the DNS server 390 through the network 199, and may deliver the same to the processor 120. The processor 120 may acquire the IP address from the DNS response message received from the communication processor 192a, and may execute a corresponding network service by using the acquired IP address.

In various embodiments, in operation 430, the communication processor 192a may set a second time value (a second TTL) less than the first time value (the first TTL), and may start a timer having the second time value (the second TTL). In an embodiment, the communication processor 192a may determine activation of a DNS alive function based on switching of the processor 120 from an active state to an inactive state, and accordingly, may set the second time value (the second TTL) and start a timer. While the DNS alive function is activated, the timer may expire and then may be restarted. The communication processor 192a may also determine activation of a DNS alive function, further based on information (e.g., a flag value representing the necessity of execution of a DNS alive function) received from the processor 120.

In various embodiments, in operation 440, the communication processor 192a may transmit a second DNS query message including the domain address to the DNS server 390 through the network 199 based on expiration of the timer having the second time value (the second TTL). In an embodiment, the communication processor 192a may recognize that the timer has expired, and accordingly, may transmit a second DNS query message to the DNS server 390 through the network 199. A second DNS query message may be a copy obtained by copying the first DNS query message by the communication processor 192a. The communication processor 192a may receive a DNS response message corresponding to the second DNS query message from the DNS server 390 through the network 199, may store the same, and may deliver the stored DNS response message to the processor 120 if a new DNS query message corresponding to the domain address is generated.

In some embodiments, before the timer expires, a second DNS query message may be transmitted to the network 199. For example, when a communication state of the electronic device 101 switches from an idle state to a connected state (e.g., an RRC connected state), if a remaining time of the timer is less than a designated threshold, the communication processor 192a may transmit a second DNS query message to the DNS server 390 through the network 199. When a communication state of the electronic device 101 is an inactive state, if a corresponding network service requires low latency or a priority of a DNS query is higher than or equal to a designated ranking, the communication state of the electronic device 101 may switch to a connected state, and the communication processor 192a may transmit a second DNS query message based on the switching to the connected state. When a communication state of the electronic device 101 is an inactive state, if a corresponding network service does not require low latency or a priority of a DNS query is low (e.g., is lower than the designated ranking), without transmission of a second DNS query message, the communication state of the electronic device 101 may switch to an idle state.

In various embodiments, in operation 450, the communication processor 192a may receive a second DNS response message from the DNS server 390 through the network 199. An IP address corresponding to the domain address and included in the second DNS response message may be identical to, or different from, an IP address corresponding to the domain address and included in a first DNS response message. A valid time included in the second DNS response message may also be identical to, or different from, a valid time included in the first DNS response message.

In various embodiments, in operation 460, the communication processor 192a may update the above-described IP address by using the second DNS response message (e.g., may change an existing IP address if an IP address included in the second DNS response message is different from the existing IP address). In addition, the processor 120 may update the first time value (the first TTL) by using the second DNS response message. Accordingly, the second time value (the second TTL) which is a set time of the timer may also be changed.

Figure 5:
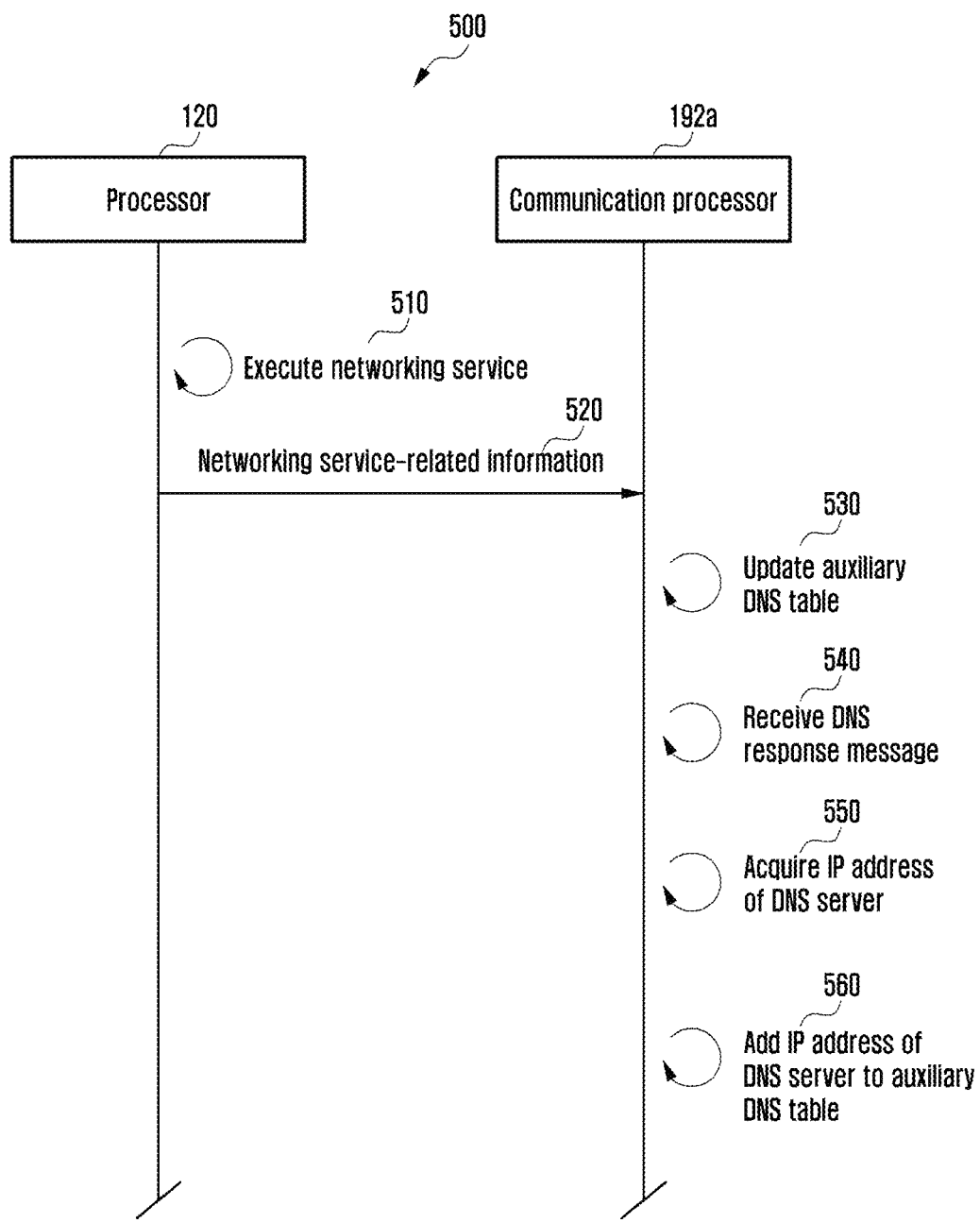
FIG. 5 is a signal flow diagram illustrating operations of initializing a DNS alive function according to various embodiments.

FIG. 5 is a signal flow diagram illustrating operations 500 of the processor 120 and the communication processor 192a for initializing a DNS alive function according to various embodiments.

In various embodiments, in operation 510, the processor 120 may execute a networking service (e.g., a URLLC networking service which needs support for URLLC). For example, the processor 120 may execute a networking service based on a user input received from an input apparatus (e.g., a touch-screen display of the input apparatus 150 or the display apparatus 160 of FIG. 1). The processor 120 may execute a networking service based on information (e.g., if the received information is related to the networking service) received from an external device (e.g., the server 108 of FIG. 1) through the communication processor 192a. The processor 120 may determine that low-latency DNS processing is needed, based on information received from an access network (e.g., an access network of the second network 294 of FIG. 2) through the communication processor 192a, and accordingly, may execute a networking service, wherein the received information is, for example, information of a base station taking charge of a cell (e.g., a cell identity and/or information on a frequency band (e.g., an absolute radio-frequency channel number (ARFCN)) designated to be used for 5G network communication) in which the electronic device 101 is currently located.

In various embodiments, in operation 520, the processor 120 may transmit information (e.g., a name or an IP/port) on an executed networking service to the communication processor 192a, and thus allows the communication processor 192a to perform (e.g., perform while the processor 120 is in an inactive state) a DNS alive function for the executed networking service.

In various embodiments, in operation 530, the communication processor 192a may update the auxiliary DNS table 330 by using the received information. For example, the communication processor 192a may add the received information (a name (e.g., Drone) of the networking service and an IP/port related thereto) to a table, such as Table 1 below, as information of a target to be managed in the future.

TABLE 1

| Networking service | IP/port | Owner | DNS query | DNS response | TTL | TTL-a |
|---|---|---|---|---|---|---|
| Drone | 192.168.1.1.:5050 | | | | | |

In various embodiments, in operation 540, the communication processor 192a may receive a DNS response message from the DNS server 390 through the network 199. For example, the communication processor 192a may transmit a DNS query message, received from the processor 120, to the DNS server 390 through the network 199. The DNS server 390 may include, in a DNS response message, an IP address corresponding to a domain address included in the DNS query message, and may transmit the DNS response message including the IP address.

In various embodiments, in operation 550, the communication processor 192a may acquire, from the DNS response message, an IP address of the DNS server 390. For example, the communication processor 192a may acquire an IP address of the DNS server 390, from a DNS response message included in a transmission control protocol (TCP) or user datagram protocol (UDP) data area of a packet received from the network 199.

In various embodiments, in operation 560, the communication processor 192a may add, to the auxiliary DNS table 330 (e.g., Table 2), a service name (e.g., DNS), an IP address of the DNS server 390, and an owner (a DNS server) of execution of a corresponding service.

example, the communication processor 192a may confirm (or identify), from a packet, an IP address of a destination which is to receive the packet. The communication processor 192a may determine the packet as a DNS query message based on coincidence between the IP address of the destination and an already-recognized address of a DNS server (e.g., Table 2).

In various embodiments, in operation 630, based on determination of the packet as the DNS query message (Yes in operation 620), the communication processor 192a may determine whether the DNS query message is related to a networking service (e.g., a networking service which needs support for URLLC) which needs to be managed by the communication processor 192a. For example, the communication processor 192a may confirm (or identify), from a packet, an IP address of a source having transmitted the packet, may confirm that the IP address of the source exists in an IP/port item of the auxiliary DNS table 330, and accordingly, may determine that the packet is related to a management target of the communication processor 192a.

In various embodiments, in operation 640, based on determination of the DNS query message as being related to a management target of the communication processor 192a

TABLE 2

| Networking service | IP/port | Owner | DNS query | DNS response | TTL | TTL-a |
|---|---|---|---|---|---|---|
| Drone | 192.168.1.1.:5050 | | | | | |
| DNS | 200.200.1.1:xxxx | DNS server | | | | |

Figure 6:
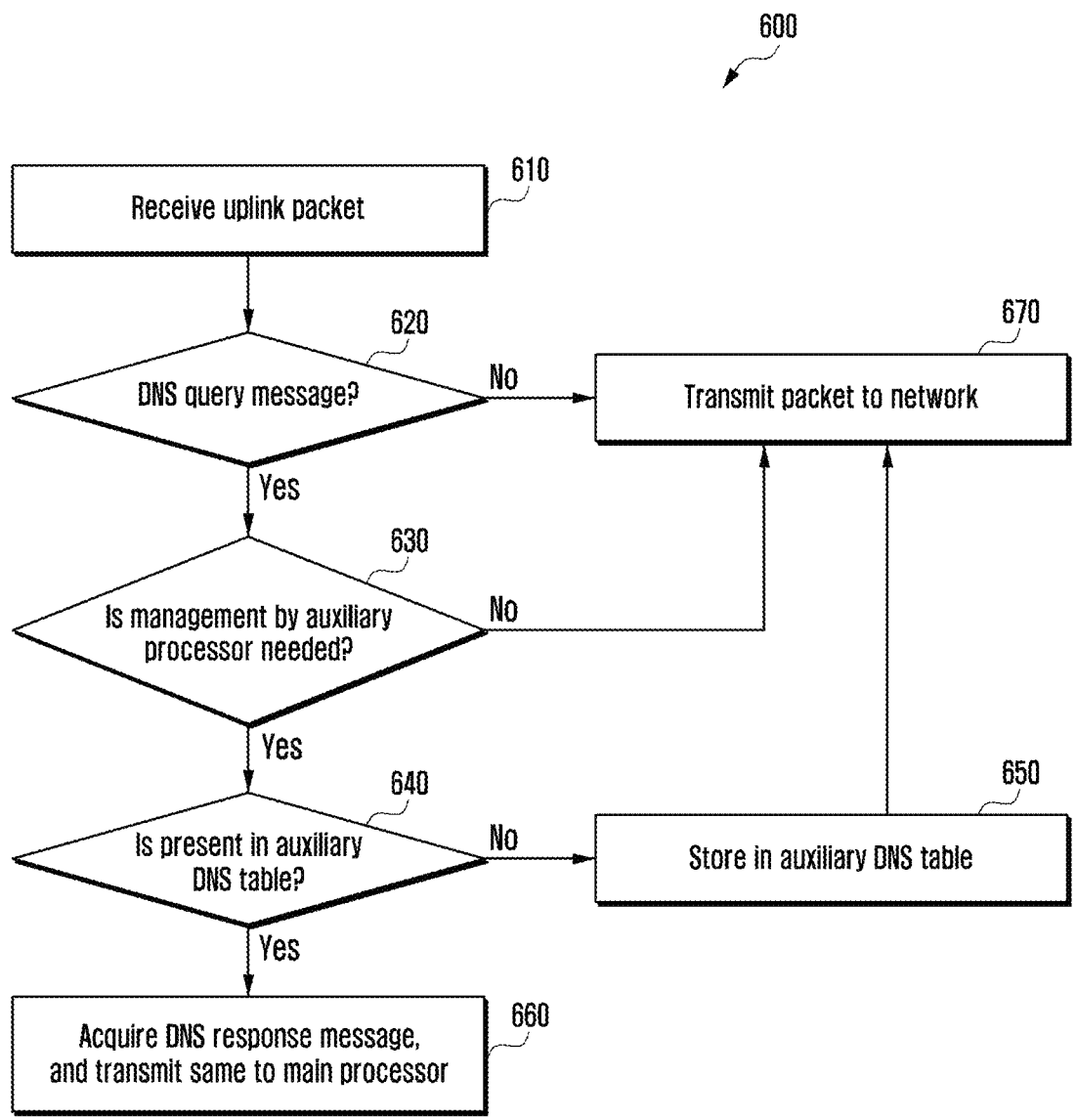
FIG. 6 is a flowchart illustrating operations performed during generation of an uplink packet according to various embodiments.

FIG. 6 is a flowchart illustrating operations 600 of the communication processor 192a which are performed during generation of an uplink packet according to various embodiments.

In various embodiments, in operation 610, the communication processor 192a may receive an uplink packet from the processor 120.

In various embodiments, in operation 620, the communication processor 192a may determine whether a packet is a DNS query message. As an example, a DNS query message may include two data areas, such as a header and a query. A query data area may include a domain address. The processor 120 may generate a DNS query message including a domain address, and may transmit the same to the communication processor 192a. A header may include fields, such as Transaction ID, Flags, OR, or Opcode. If a numeral of the Opcode field among the fields is, for example, 0, the communication processor 192a may determine the packet as a DNS query message. As another (Yes in operation 630), the communication processor 192a may determine whether a response message corresponding to the DNS query message exists in the auxiliary DNS table 330.

In various embodiments, in operation 650, based on determination of the response message corresponding to the DNS query message as not existing in the auxiliary DNS table 330 (No in operation 640), the communication processor 192a may store the DNS query message in the auxiliary DNS table 330. As an example, referring to Table 3 below, the communication processor 192a may acquire, from the DNS query message, a domain address (www-.drone.co.kr) as a DNS query for a networking service named "Drone", and may record the same in a corresponding item of the auxiliary DNS table 330. In addition, the communication processor 192a may record, in a corresponding item of the auxiliary DNS table 330, a name (e.g., an application processor (AP)) of an owner (e.g., the processor 120) having triggered a DNS query.

TABLE 3

| Networking service | IP/port | Owner | DNS query | DNS response | TTL | TTL-a |
|---|---|---|---|---|---|---|
| Drone | 192.168.1.1.:5050 | AP | www.drone.co.kr | | | |
| DNS | 200.200.1.1:xxxx | DNS server | | | | |

In various embodiments, in operation 660, based on determination of the DNS response corresponding to the DNS query message as existing in the auxiliary DNS table auxiliary DNS table 330, respectively. In addition, the communication processor 192a may set a second time value (TTL-a) to be less by "a (e.g., 7)" than the first time value.

TABLE 4

| Networking service | IP/port | Owner | DNS query | DNS response | TTL | TTL-a |
|---|---|---|---|---|---|---|
| Drone | 192.168.1.1.:5050 | AP | www.drone.co.kr | 222.333.44.55:9090 | 100 | 93 |
| DNS | 200.200.1.1:xxxx | DNS server | | | | |

330 (Yes in operation 640), the communication processor 192a may acquire a DNS response (e.g., an IP address) from the auxiliary DNS table 330, and may transmit the same to the processor 120.

In various embodiments, in operation 670, the communication processor 192a may transmit a packet to the network 199: i) if it is determined in operation 620 that the received packet is not a DNS query message; ii) if it is determined in operation 630 that the DNS query message is not related to a management target of the communication processor 192a; or iii) after the DNS query message is stored in the auxiliary DNS table 330 in operation 650.

Figure 7:
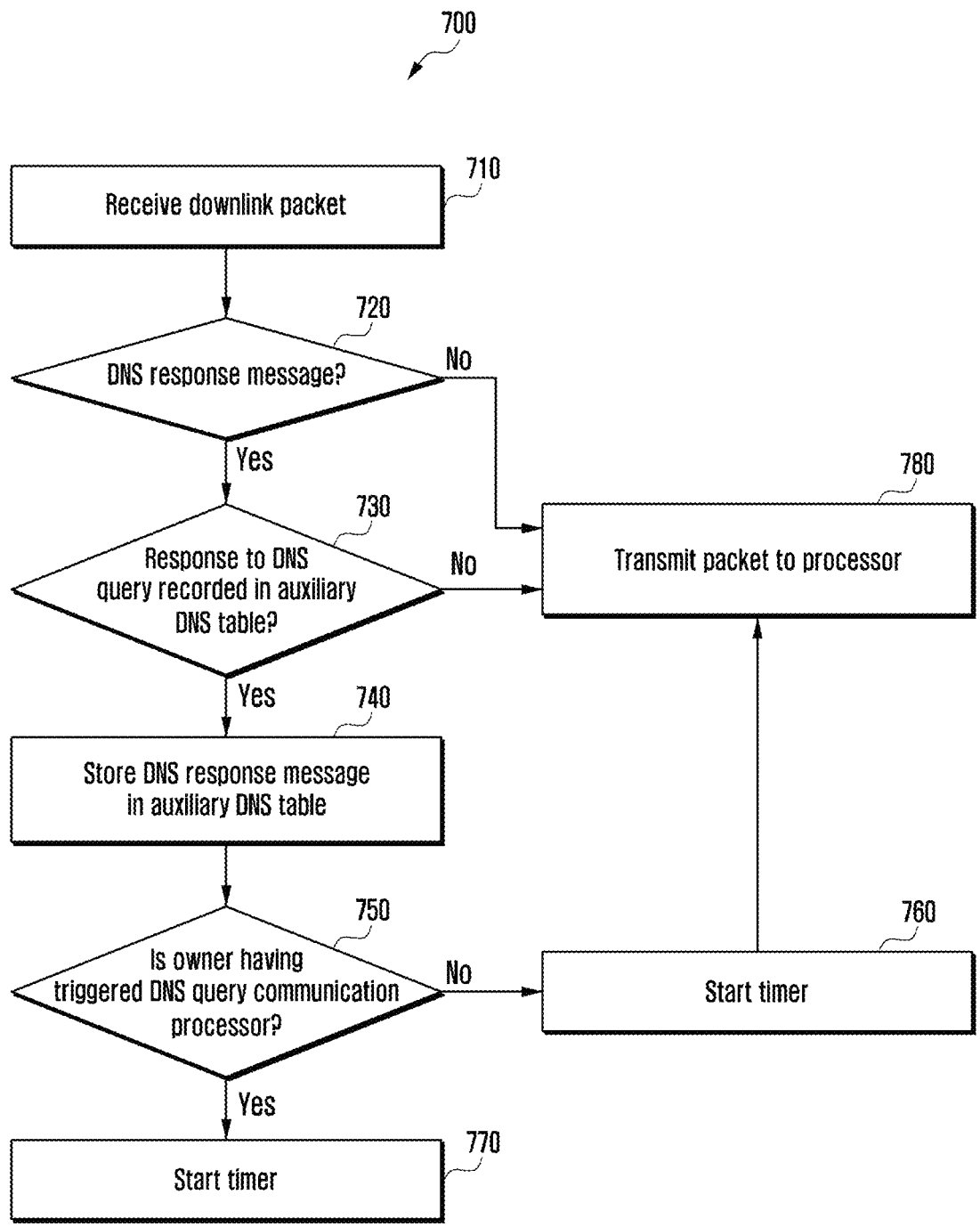
FIG. 7 is a flowchart illustrating operations performed during generation of a downlink packet according to various embodiments.

FIG. 7 is a flowchart illustrating operations 700 of the communication processor 192a performed during generation of a downlink packet according to various embodiments.

In various embodiments, in operation 710, the communication processor 192a may receive a downlink packet from the network 199 through the wireless communication module 192.

In various embodiments, in operation 720, the communication processor 192a may determine whether the packet is a DNS response message. As an example, a DNS response message may include five data areas, such as header, query (or Question), Answer, Authority, and Additional. An IP address corresponding to a domain address included in the query data area may be included in the Answer data area. If a numeral of an Opcode field among the fields of the header is, for example, 1, the communication processor 192a may determine the packet as a DNS response message. As another example, the communication processor 192a may confirm (or identify), from a packet, an IP address of a source having transmitted the packet. The communication processor 192a may determine the packet as a DNS response message based on coincidence between the IP address of the source and an already-recognized address of a DNS server (e.g., Table 2).

In various embodiments, in operation 730, based on determination of the packet as the DNS response message (Yes in operation 720), the communication processor 192a may determine whether the DNS response message is a response to a DNS query recorded in the auxiliary DNS table 330.

In various embodiments, in operation 740, based on determination of the DNS response message as the response to the DNS query recorded in the auxiliary DNS table 330 (Yes in operation 730), the communication processor 192a may store the DNS response message in the auxiliary DNS table 330. As an example, referring to Table 4 below, the communication processor 192a may acquire, from the DNS response message, the IP address "222.333.44.55:9090" and the first time value (TTL) "100" as a DNS response to a networking service named "Drone", and may store the IP address and the first time value in corresponding items of the In various embodiments, in operation 750, the communication processor 192a may determine whether an owner having triggered a DNS query is the communication processor 192a.

In various embodiments, in operation 760, based on determination of the owner having triggered the DNS query as the processor 120 (e.g., the owner "AP" of the networking service "Drone" in Table 4) (No in operation 750), the communication processor 192a may start a timer having the second time value.

In various embodiments, in operation 770, based on determination of the owner having triggered the DNS query as the communication processor 192a (Yes in operation 750), the communication processor 192a may start a timer having the second time value.

In various embodiments, in operation 780, the communication processor 192a may transmit a packet to the processor 120: i) if it is determined in operation 720 that the received packet is not a DNS response message; ii) if it is determined in operation 730 that the DNS response message is not a response to a DNS query recorded in the auxiliary DNS table 330; or iii) after the timer is started in operation 760.

Operation 770 may be performed prior to operation 750. In this example, based on determination of the owner having triggered the DNS query as the processor 120 (No in operation 750), the communication processor 192a may perform operation 780. Based on determination of the owner having triggered the DNS query as the communication processor 192a (Yes in operation 750), the communication processor 192a may terminate the process without performing any operation.

Figure 8:
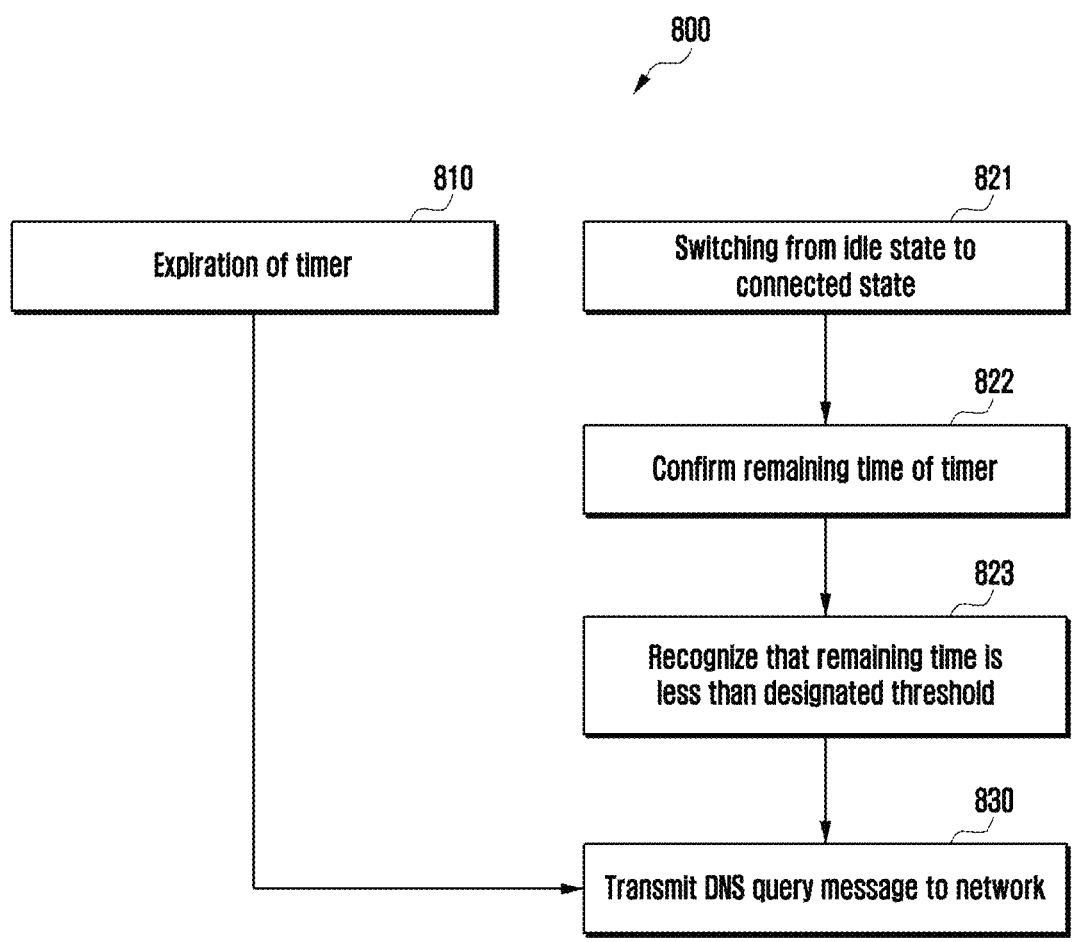
FIG. 8 is a flowchart illustrating operations of holding a valid IP address according to various embodiments.

FIG. 8 is a flowchart illustrating operations 800 of the communication processor 192a for holding a valid IP address according to various embodiments.

In various embodiments, in operation 810, the communication processor 192a may recognize expiration of a timer having a second time value (e.g., the second time value in Table 4).

In various embodiments, in operation 821, the communication processor 192a may recognize that a communication state of the electronic device 101 switches from an idle state to a connected state. In operation 822, the communication processor 192a may confirm a remaining time of the timer corresponding to the second time (e.g., the second time value in Table 4) based on recognition of the switching. In operation 823, the communication processor 192a may recognize that the remaining time is less than a designated threshold.

In various embodiments, in operation 830, the communication processor 192a may transmit a DNS query message to the network 199 based on recognition of the expiration of the timer in operation 810 or based on recognition of the remaining time in operation 823. In addition, the communication processor 192a may record, in the auxiliary DNS table 330, that an owner having triggered transmission of the DNS query message is the communication processor 192*a*. For example, referring to Table 5 below, the communication processor 192*a* may change an owner of a networking service named "Drone" from AP to CP.

TABLE 5

| Networking service | IP/port | Owner | DNS query | DNS response | TTL | TTL-a |
|---|---|---|---|---|---|---|
| Drone | 192.168.1.1.:5050 | CP | www.drone.co.kr | 222.333.44.55:9090 | 100 | 93 |
| DNS | 200.200.1.1:xxxx | DNS server | | | | |

According to various embodiments, an electronic device may include: a communication processor (e.g., the communication processor 192*a* of FIG. 1); a processor (e.g., the processor 120 of FIG. 1) configured to be operatively connected to the communication processor; and a memory configured to be operatively connected to the processor and the communication processor. The memory may store a domain name system (DNS) table, and may store first instructions that, when executed, cause the processor to: generate a first DNS query message including a domain address based on execution of a networking service; and deliver the first DNS query message to the communication processor. The memory may store second instructions that, when executed, cause the communication processor to update the DNS table by periodically performing: an operation of receiving, from a network, a first DNS response message including an IP address corresponding to the domain address, as a response to the first DNS query message, and delivering the first DNS response message to the processor; and an operation of transmitting a second DNS query message including the domain address to the network, and receiving, from the network, a second DNS response message as a response to the second DNS query message.

The first DNS response message may include a first time value representing a valid time of the IP address, and the second instructions may cause the communication processor to perform an operation of: setting a second time value less than the first time value, and starting a timer having the second time value; and updating the DNS table whenever the timer expires. The second instructions may cause the communication processor to perform an operation of updating the DNS table, based on recognition of a communication state of the electronic device as switching from an idle state to a connected state, and recognition of a remaining time of the timer as being less than a designated threshold.

The first instructions may cause the processor to recognize an IP address of the updated DNS table as a valid IP address required during the execution of the networking service.

The first instructions may cause the processor to perform an operation of updating the DNS table, based on recognition of the networking service as a service which needs support for ultra-reliable and low-latency communication (URLLC) of a 5G network defined in 3GPP or IMT-2020.

The second instructions may cause the communication processor to perform an operation of updating the IP address, when the processor is in an inactive state.

The second instructions may cause the communication processor to transmit an IP address of the updated DNS table to the processor based on a request of the processor.

The DNS table may include: a first item for identifying a name of the networking service; a second item for identifying an IP address of the networking service; a third item for identifying the domain address; and a fourth item for identifying an IP address corresponding to the domain address, and the second instructions may cause the communication processor to periodically perform an operation of updating the fourth item.

The DNS table may include: a fifth item for identifying a first time value representing a valid time of the IP address of the fourth item; and a sixth item for identifying a second time value set to be less than the first time value, and the second instructions may cause the communication processor to perform an operation of starting a timer having the second time value, and updating the DNS table whenever the timer expires.

The second instructions may cause the communication processor to transmit the IP address of the fourth item to the processor based on recognition of an uplink packet received from the processor as a DNS query message, recognition of the uplink packet as being related to the first item, and recognition of the fourth item as including the IP address (e.g., operation 660).

The second instructions may cause the communication processor to transmit the uplink packet to the network if the uplink packet is not the DNS query message, if the uplink packet is not related to the first item, or based on recognition of the fourth item as not including the IP address (e.g., operation 670).

The second instructions may cause the communication processor to update the fourth item based on recognition of a downlink packet received from the network as a DNS response message, and recognition of the downlink packet as a response to the third item (e.g., operation 740).

The DNS table further may include: a fifth item for identifying a first time value representing a valid time of the IP address of the four items; a sixth item for identifying a second time value set to be less than the first time value; and a seventh item for identifying an owner triggering transmission of a DNS query message to the network, and the second instructions may cause the communication processor to start a timer having the second time value based on recognizing, from the seventh item, that the owner is the communication processor (e.g., operation 770).

The second instructions may cause the communication processor to start a timer having the second time value and transmit the downlink packet to the processor, based on recognizing, from the seventh item, that the owner is the processor (e.g., operations 760 and 780).

The DNS table further may include: a fifth item for identifying a first time value representing a valid time of the IP address of the four items; a sixth item for identifying a second time value set to be less than the first time value; and a seventh item for identifying an owner triggering transmission of a DNS query message to the network, and the second instructions may cause the communication processor to: transmit a DNS query message including the domain address, based on recognition of expiration of the timer, or recognition of a remaining time of the timer as being less than a designated threshold in case that a communication state of the electronic device switches from an idle state to a connected state; and record, in the seventh item, information indicating the communication processor as the owner (e.g., operation 830).

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
  a communication processor;
  a processor configured to be operatively connected to the communication processor; and
    a memory configured to be operatively connected to the processor and the communication processor, the memory storing:
    a domain name system (DNS) table,
    first instructions that, when executed by the processor, cause the processor to:
      generate a first DNS query message comprising a domain address based on execution of a networking service, and
      deliver the first DNS query message to the communication processor, and
    second instructions that, when executed by the communication processor, cause the communication processor to:
      transmit the first DNS query message to a network,
      receive, from the network, a first DNS response message comprising an IP address corresponding to the domain address, as a response to the first DNS query message,
      deliver the first DNS response message to the processor, and
      while the processor is in an inactive state, periodically update the DNS table, by causing the communication processor to:
        transmit a second DNS query message comprising the domain address to the network,
        receive, from the network, a second DNS response message as a response to the second DNS query message, and
        update the DNS table based on the second DNS response message.

2. The electronic device of claim 1, wherein:
  the first DNS response message comprises a first time value representing a valid time of the IP address, and
  the second instructions, when executed by the communication processor, cause the communication processor to:
    set a second time value less than the first time value,
    start a timer including the second time value, and
    update the DNS table whenever the timer expires.

3. The electronic device of claim 2, wherein the second instructions, when executed by the communication processor, cause the communication processor to:
  update the DNS table, based on recognition of a communication state of the electronic device as switching from an idle state to a connected state and recognition of a remaining time of the timer as being less than a designated threshold.

4. The electronic device of claim 1, wherein the first instructions, when executed by the processor, cause the processor to recognize an IP address of the updated DNS table as a valid IP address required during the execution of the networking service.

5. The electronic device of claim 1, wherein the first instructions, when executed by the processor, cause the processor to update the DNS table based on recognition of the networking service as a service that needs support for ultra-reliable and low-latency communication (URLLC) of a 5G network defined in 3GPP or IMT-2020.

6. The electronic device of claim 1, wherein the second instructions, when executed by the communication processor, cause the communication processor to:
  when a DNS response message corresponding to a DNS query message received from the processor exists in the DNS table, acquire, from the updated DNS table, the DNS response message corresponding to the received DNS query message and transmit the acquired DNS response message to the processor instead of transmitting, to the network, the DNS query message corresponding to the received DNS query message.

7. The electronic device of claim 1, wherein the DNS table comprises:
  a first item for identifying a name of the networking service;
  a second item for identifying an IP address of the networking service;
  a third item for identifying the domain address; and
  a fourth item for identifying an IP address corresponding to the domain address,
  wherein the second instructions, when executed by the communication processor, cause the communication processor to periodically update the fourth item.

8. The electronic device of claim 7, wherein the DNS table comprises:
  a fifth item for identifying a first time value representing a valid time of the IP address of the fourth item; and
  a sixth item for identifying a second time value set to be less than the first time value,
  wherein the second instructions, when executed by the communication processor, cause the communication processor to:
    start a timer including the second time value, and
    update the DNS table whenever the timer expires.

9. The electronic device of claim 7, wherein the second instructions, when executed by the communication processor, cause the communication processor to transmit the IP address of the fourth item to the processor based on recognition of an uplink packet received from the processor as a DNS query message, recognition of the uplink packet as being related to the first item, and recognition of the fourth item as comprising the IP address.

10. The electronic device of claim 9, wherein the second instructions, when executed by the communication processor, cause the communication processor to transmit the uplink packet to the network based on the uplink packet not being the DNS query message, based on the uplink packet not being related to the first item, or based on recognition of the fourth item as not comprising the IP address.

11. The electronic device of claim 7, wherein the second instructions, when executed by the communication processor, cause the communication processor to update the fourth item based on recognition of a downlink packet received from the network as a DNS response message and recognition of the downlink packet as a response to the third item.

12. The electronic device of claim 11, wherein the DNS table further comprises:

a fifth item for identifying a first time value representing a valid time of the IP address of the first through fourth items;

a sixth item for identifying a second time value set to be less than the first time value; and a seventh item for identifying an owner triggering transmission of a DNS query message to the network, wherein the second instructions, when executed by the communication processor, cause the communication processor to start a timer including the second time value based on recognizing, from the seventh item, that the owner is the communication processor.

13. The electronic device of claim 12, wherein the second instructions, when executed by the communication processor, cause the communication processor to start a timer including the second time value and transmit the downlink packet to the processor based on recognizing, from the seventh item, that the owner is the processor.

14. The electronic device of claim 7, wherein the DNS table further comprises:

a fifth item for identifying a first time value representing a valid time of the IP address of the first through fourth items;

a sixth item for identifying a second time value set to be less than the first time value; and a seventh item for identifying an owner triggering transmission of a DNS query message to the network, wherein the second instructions, when executed by the communication processor, cause the communication processor to:

transmit a DNS query message comprising the domain address based on recognition of expiration of a timer or recognition of a remaining time of the timer as being less than a designated threshold when a communication state of the electronic device switches from an idle state to a connected state; and record, in the seventh item, information indicating the communication processor as the owner.

15. A method for operating an electronic device, the method comprising:

generating, by a processor of the electronic device, a first domain name system (DNS) query message comprising a domain address based on execution of a networking service to deliver the first DNS query message to a communication processor of the electronic device;

transmitting, by the communication processor, the first DNS query message to a network;

receiving, by the communication processor from the network, a first DNS response message comprising an IP address corresponding to the domain address, as a response to the first DNS query message;

delivering, by the communication processor, the first DNS response message to the processor; and while the processor is in an inactive state, periodically updating, by the communication processor, a DNS table by:

transmitting a second DNS query message comprising the domain address to the network, receiving, from the network, a second DNS response message as a response to the second DNS query message, and updating the DNS table based on the second DNS response message.

16. The method of claim 15, wherein:

the first DNS response message comprises a first time value representing a valid time of the IP address, the method further comprises setting a second time value less than the first time value and starting a timer, including the second time value, by the communication processor, and the updating of the DNS table is performed whenever the timer expires.

17. The method of claim 16, further comprising recognizing, by the communication processor, that a communication state of the electronic device switches from an idle state to a connected state and a remaining time of the timer is less than a designated threshold, wherein the updating of the DNS table is performed based on a result of the recognition.

18. The method of claim 15, further comprising recognizing an IP address of the updated DNS table as a valid IP address required during the execution of the networking service, by the communication processor.

19. The method of claim 15, further comprising recognizing, by the communication processor, that the networking service needs support for ultra-reliable and low-latency communication (URLLC) of a 5G network defined in 3GPP or IMT-2020, wherein the updating of the DNS table is performed based on a result of the recognition.

* * * * *